US012327956B1

(12) United States Patent
Baldwin et al.

(10) Patent No.: US 12,327,956 B1

(45) Date of Patent: Jun. 10, 2025

(54) TWO-PART POWERED ELECTRICAL WALL PLATE

(71) Applicant: Titan3 Technology LLC, Tempe, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 327 days.

(21) Appl. No.: 18/103,335

(22) Filed: Jan. 30, 2023

Related U.S. Application Data

(60) Provisional application No. 63/305,602, filed on Feb. 1, 2022.

(51) Int. Cl.

| | |
|---|---|
| ***H01R 13/66*** | (2006.01) |
| ***H01R 13/70*** | (2006.01) |
| ***H01R 13/717*** | (2006.01) |
| ***H01R 24/78*** | (2011.01) |

(52) U.S. Cl.

CPC ......... *H01R 13/665* (2013.01); *H01R 13/701* (2013.01); *H01R 13/717* (2013.01); *H01R 24/78* (2013.01)

(58) Field of Classification Search

CPC .. H01R 13/665; H01R 13/701; H01R 13/717; H01R 24/78

See application file for complete search history.

(56) References Cited

U.S. PATENT DOCUMENTS

| | | | |
|---|---|---|---|
| 3,522,595 | A | 8/1970 | White |
| 4,514,789 | A | 4/1985 | Jester |
| 4,536,694 | A | 8/1985 | McCarty |

(Continued)

FOREIGN PATENT DOCUMENTS

| | | | |
|---|---|---|---|
| DE | 102016006308 | A1 | 10/2017 |
| EP | 3104350 | A1 | 12/2016 |
| JP | 2019056906 | A | 4/2019 |
| KR | 20100012881 | | 2/2010 |

OTHER PUBLICATIONS

Combination Wireless Wall Mount Charger & USB Outlet, https://www.hubbell.com/wiringdevice-kellems/en/Products/Electrical-Electronic/Wiring-Devices/Charging-Solutions/Power-Charging-Stations/USB2028AC/p/3936295#prod-resources-section. Printed on Jan. 28, 2020, 2 pages.

(Continued)

*Primary Examiner* — Travis S Chambers

(74) *Attorney, Agent, or Firm* — Kenneth C. Booth; Booth Udall Fuller, PLC

(57) ABSTRACT

A powered wall plate with a rear frame and a front cover plate. The rear frame is configured to couple with an electrical device and may have a rear frame central aperture extending through the rear frame, terminal connectors extending away from the rear frame adjacent to the rear frame central aperture and configured to electrically couple with the electrical terminals on the electrical device, an electrical circuit electrically coupled to the terminal connectors and configured to power an electrical feature in the powered wall plate, and a screw aperture configured to receive a screw and couple the rear frame to the electrical device. The front cover plate is configured to attach to the rear frame and cover the rear frame and the screw aperture. The front cover plate has a front cover central aperture that is configured to align with the rear frame central aperture.

20 Claims, 7 Drawing Sheets

(56) References Cited

U.S. PATENT DOCUMENTS 4,617,613 A * 10/1986 Rice .................... H01R 13/717
362/95
4,835,343 A 5/1989 Graef
4,897,049 A 1/1990 Miller
5,094,630 A 3/1992 Jammet
5,180,886 A 1/1993 Dierenbach
5,384,428 A 1/1995 Luu
5,401,184 A 3/1995 Sundstrom
5,539,821 A 7/1996 Blonder
5,700,158 A 12/1997 Neiser
5,708,705 A 1/1998 Yamashita
5,769,653 A 6/1998 Osterbrock
5,932,845 A 8/1999 Lacy
6,026,605 A 2/2000 Tippett
6,051,788 A 4/2000 Nichols
6,056,450 A 5/2000 Walling
6,160,219 A 12/2000 Maltby
6,297,450 B1 10/2001 Yu
6,423,900 B1 * 7/2002 Soules .................. H01R 24/78
6,511,343 B1 1/2003 Shotey
6,520,792 B2 2/2003 Chen-Chiang
6,674,003 B1 1/2004 Torres
6,697,117 B1 2/2004 Park
6,752,541 B1 6/2004 Dykyj
6,864,798 B2 3/2005 Janik
6,897,381 B2 5/2005 He
6,923,663 B2 8/2005 Oddsen
6,977,341 B1 12/2005 Gustaveson, II
6,981,896 B2 1/2006 Su
6,993,289 B2 1/2006 Janik
6,993,417 B2 1/2006 Osann, Jr.
7,036,948 B1 * 5/2006 Wyatt ................ H01R 13/6683
362/276
7,140,922 B2 11/2006 Luu
7,167,078 B2 1/2007 Pourchot
7,247,793 B2 7/2007 Hinkson
7,271,339 B2 9/2007 Dinh
7,394,019 B2 7/2008 Gesue
7,582,830 B2 9/2009 Claffy
7,654,855 B2 2/2010 Liao
7,833,037 B2 11/2010 Reusche
7,887,341 B2 2/2011 Liao
7,896,702 B2 3/2011 Stiehl
7,902,458 B2 3/2011 Eshelman
7,930,118 B2 4/2011 Vinden
7,931,008 B2 4/2011 Verner
7,981,896 B2 7/2011 Bennani
7,983,064 B2 7/2011 Zhang
8,308,493 B2 11/2012 Lim
8,342,861 B2 1/2013 Stiehl
8,378,625 B2 2/2013 Gourley
8,456,131 B2 6/2013 Bukow
8,668,347 B2 * 3/2014 Ebeling ................ H01R 25/006
174/67
8,668,647 B2 3/2014 Eskandari
8,712,486 B2 4/2014 Sorias
8,834,210 B2 9/2014 Brausen
8,864,517 B2 10/2014 Cohen
8,912,442 B2 12/2014 Smith
8,951,053 B2 2/2015 Ho
9,035,180 B2 5/2015 Smith
9,035,181 B2 5/2015 Smith
9,065,263 B2 6/2015 Porcano
9,071,740 B1 6/2015 Duffy
9,083,180 B2 7/2015 Dodal
9,113,051 B1 8/2015 Scalisi
9,124,105 B2 9/2015 Gunderman
9,329,607 B2 5/2016 Kevelos
9,362,728 B2 6/2016 Smith
9,398,667 B2 7/2016 Kevelos
9,464,795 B2 10/2016 Ebeling
9,482,426 B2 * 11/2016 Diotte .................... H01R 24/78
9,551,454 B2 1/2017 Lipke
D781,241 S 3/2017 Knight
9,732,921 B2 8/2017 Chien
9,742,111 B2 8/2017 Smith
9,768,562 B2 9/2017 Smith
9,769,420 B1 9/2017 Moses
9,825,414 B2 11/2017 Armstrong
9,882,313 B2 1/2018 Steinbuchel, IV
9,882,318 B2 1/2018 Smith
9,882,361 B2 1/2018 Smith
9,917,430 B2 3/2018 Smith
9,941,642 B1 4/2018 Waggoner
9,997,860 B1 6/2018 Hernandez, Jr.
10,063,316 B2 8/2018 McColloch
10,074,948 B2 * 9/2018 Goyal ................ H01R 13/6675
10,136,534 B2 11/2018 Ebeling
10,161,806 B2 12/2018 Lermann
10,276,979 B2 4/2019 Cyzen
10,305,216 B1 5/2019 Shotey
10,340,722 B2 7/2019 Rohmer
10,381,788 B2 8/2019 Smith
10,381,789 B2 8/2019 Smith
10,446,970 B2 10/2019 Shotey
10,505,326 B2 12/2019 Chien
10,587,067 B2 3/2020 Lager
10,642,231 B1 5/2020 Billings
10,644,465 B2 5/2020 O'Reilly
10,665,996 B2 5/2020 O'Reilly
10,687,432 B2 6/2020 Ebeling
10,720,727 B1 * 7/2020 Shotey ..................... H02G 3/12
10,729,223 B2 8/2020 Weaver
10,764,561 B1 9/2020 Devitt
10,796,798 B1 10/2020 Stone
10,903,636 B1 1/2021 Baldwin
10,985,516 B1 4/2021 Gartside
11,011,867 B1 5/2021 Shotey
11,063,396 B2 7/2021 Iaconis
11,189,975 B1 11/2021 Baldwin
11,277,587 B1 3/2022 Baldwin
11,394,157 B2 7/2022 Smith
11,404,831 B1 8/2022 Baldwin
11,489,280 B1 11/2022 Baldwin
11,489,323 B1 11/2022 Baldwin
11,509,102 B1 11/2022 Baldwin
11,632,844 B2 4/2023 Ebeling
2001/0017339 A1 8/2001 Brotz
2003/0108099 A1 6/2003 Nagumo
2003/0201371 A1 10/2003 Zadok
2004/0121648 A1 6/2004 Voros
2004/0142601 A1 7/2004 Luu
2004/0189130 A1 9/2004 Hovanky
2005/0025360 A1 2/2005 Gin
2008/0024605 A1 1/2008 Osann, Jr.
2008/0088703 A1 4/2008 Dollahite
2008/0157715 A1 7/2008 Rosenboom
2008/0272258 A1 11/2008 Wysoczynski
2009/0141477 A1 6/2009 Bhosale
2010/0118162 A1 5/2010 Saijo
2012/0007555 A1 1/2012 Bukow
2012/0025972 A1 2/2012 Boyden
2012/0068612 A1 3/2012 Ebeling
2013/0050657 A1 2/2013 Morohoshi
2013/0100279 A1 4/2013 Nordenfelt
2014/0132475 A1 5/2014 Bhutani
2014/0162777 A1 6/2014 Hsu
2014/0274143 A1 9/2014 Trantow
2014/0320663 A1 10/2014 Chien
2014/0354219 A1 12/2014 Fan
2014/0375532 A1 12/2014 Chien
2015/0189226 A1 7/2015 Gravina
2015/0340826 A1 11/2015 Chien
2015/0357762 A1 * 12/2015 Green .................. H01R 25/006
439/95
2016/0277679 A1 9/2016 Kimura
2016/0285220 A1 9/2016 Haw
2017/0041530 A1 2/2017 Kimura
2017/0223109 A1 8/2017 Shoemake
2018/0013271 A1 1/2018 Goulden
2018/0188779 A1 7/2018 Allen
2018/0193545 A1 7/2018 Crnkovich
2018/0241146 A1 8/2018 Smith
2018/0253162 A1 9/2018 Wroblewski

(56) References Cited

U.S. PATENT DOCUMENTS

| | | | |
|---|---|---|---|
| 2018/0301882 | A1 | 10/2018 | Smith |
| 2019/0020183 | A1 | 1/2019 | Hitchman |
| 2019/0212230 | A1 | 7/2019 | Novosselov |
| 2019/0219899 | A1 | 7/2019 | Vega |
| 2019/0229478 | A1 | 7/2019 | Iaconis |
| 2020/0120328 | A1 | 4/2020 | Hamilton |
| 2020/0196141 | A1 | 6/2020 | Baker |
| 2020/0216025 | A1 | 7/2020 | Le Bourgeois |
| 2020/0412070 | A1 | 12/2020 | Owen |
| 2021/0098949 | A1 | 4/2021 | Diotte |

OTHER PUBLICATIONS

Radiant Wireless Charger, https://www.legrand.us/radiant/products/outlets/rwc826usbwccv2.aspx. Printed on Jan. 28, 2020, 10 pages.

AES System Cameras Date First Available Jul. 25, 2016 (Year: 2016) 7 pages.

* cited by examiner

TWO-PART POWERED ELECTRICAL WALL PLATE

CROSS REFERENCE TO RELATED APPLICATIONS

This application claims the benefit of the filing date of U.S. Provisional Patent Application 63/305,602 entitled "Two-Part Powered Electrical Wall Plate" to Baldwin et al. that was filed on Feb. 1, 2022, the disclosure of which is hereby incorporated herein by this reference.

TECHNICAL FIELD

Aspects of this document relate generally to a powered wall plate, and more specifically to a powered wall plate that is mounted to an electrical device in two parts or stages.

BACKGROUND

One of the difficulties associated with installing a powered wall plate is that, when the installer places the wall plate over the electrical receptacle, the installer's view of the connection points between the electrical receptacle and the wall plate is blocked by the wall plate because the wall plate is designed to cover and enclose the potentially dangerous electrical connections for the electrical receptacle. Particularly for powered wall plates that include spring arms that extend backward of the electrical wall plate to engage the electrical connection terminals on the sides of the electrical receptacle, this is a concern because if the spring arms are not properly aligned with a secure connection, there is a risk of sparks or arcing which could result in a fire.

SUMMARY

Aspects of this document relate to a powered wall plate comprising a rear frame configured to couple with an electrical device, the rear frame having a rear frame central aperture sized to expose the electrical device through the rear frame central aperture, at least two terminal connectors extending away from the rear frame adjacent the rear frame central aperture, the terminal connectors configured to electrically couple with electrical terminals on the electrical device, an electrical circuit electrically coupled to the at least two terminal connectors and including an electrical feature fixedly attached to the rear frame and powered by the electrical circuit, and a screw aperture extending through the rear frame, the screw aperture configured to receive a screw and couple the rear frame to the electrical device, and a front cover plate configured to snap onto the rear frame and cover the rear frame and the screw aperture, the front cover plate having a front cover central aperture sized to expose the electrical device through the front cover central aperture and configured to align with the rear frame central aperture when the front cover plate is snapped onto the rear frame, and a circuit switch on a front face of the front cover plate configured to couple with the electrical circuit when the front cover plate is snapped onto the rear frame and control power to the electrical feature, wherein the front cover plate is configured to expose the electrical feature of the rear frame through the front cover plate.

Particular embodiments may comprise one or more of the following features. The rear frame may be configured to couple to the electrical device independent of the front cover plate. The rear frame may be shaped to allow a user to see the terminal connectors in contact with the electrical terminals of the electrical device when the rear frame is coupled to the electrical device. The rear frame may further have an indicator light configured to indicate whether the rear frame is properly installed on the electrical device. The front cover plate may further have a protrusion extending toward the rear frame and the rear frame may further have an attachment aperture configured to receive the protrusion of the front cover plate, wherein the protrusion is configured to snap into the attachment aperture to couple the front cover plate to the rear frame.

Aspects of this document relate to a powered wall plate comprising a rear frame configured to couple with an electrical device, the rear frame having a rear frame central aperture sized to expose the electrical device through the rear frame central aperture, at least two terminal connectors extending away from the rear frame adjacent the rear frame central aperture, the terminal connectors configured to electrically couple with electrical terminals on the electrical device, and an electrical circuit electrically coupled to the at least two terminal connectors and including an electrical feature powered by the electrical circuit, and a front cover plate configured to attach to the rear frame and cover the rear frame, the front cover plate having a front cover central aperture sized to expose the electrical device through the front cover central aperture and configured to align with the rear frame central aperture when the front cover plate is attached to the rear frame, wherein the front cover plate is configured to expose the electrical feature of the rear frame, wherein the rear frame is configured to couple to the electrical device independent of the front cover plate.

Particular embodiments may comprise one or more of the following features. The rear frame may be shaped to allow a user to see the terminal connectors in contact with the electrical terminals of the electrical device when the rear frame is coupled to the electrical device. The rear frame may further have a screw aperture extending through the rear frame, the screw aperture configured to receive a screw and couple the rear frame to the electrical device. The front cover plate may be configured to cover the screw aperture. The front cover plate may be configured to snap onto the rear frame. The front cover plate may further have a protrusion extending toward the rear frame and the rear frame may further have an attachment aperture configured to receive the protrusion of the front cover plate, wherein the protrusion is configured to snap into the attachment aperture to couple the front cover plate to the rear frame. The rear frame may further have an indicator light configured to indicate whether the rear frame is properly installed on the electrical device.

Aspects of this document relate to a powered wall plate comprising a rear frame configured to couple with an electrical device, the rear frame having a rear frame central aperture extending through the rear frame sized to expose the electrical device through the rear frame central aperture and a screw aperture extending through the rear frame, the screw aperture configured to receive a screw and couple the rear frame to the electrical device, an electrical circuit configured to electrically couple to the electrical device, an electrical feature powered by the electrical circuit, and a front cover plate configured to attach to the rear frame and cover the rear frame and the screw aperture, the front cover plate having a front cover central aperture sized to expose the electrical device through the front cover central aperture and configured to align with the rear frame central aperture when the front cover plate is attached to the rear frame, wherein the front cover plate is configured to expose the electrical feature.

Particular embodiments may comprise one or more of the following features. The rear frame may further have at least two terminal connectors extending away from the rear frame adjacent the rear frame central aperture, the terminal connectors configured to electrically couple with electrical terminals on the electrical device. The rear frame may be shaped to allow a user to see the terminal connectors in contact with the electrical terminals of the electrical device when the rear frame is coupled to the electrical device. The rear frame may be configured to couple to the electrical device independent of the front cover plate. The front cover plate may further have a circuit switch on a front face of the front cover plate configured to couple with the electrical circuit when the front cover plate is attached to the rear frame and control power to the electrical feature. The front cover plate may be configured to snap onto the rear frame. The front cover plate may further have a protrusion extending toward the rear frame and the rear frame may further have an attachment aperture configured to receive the protrusion of the front cover plate, wherein the protrusion is configured to snap into the attachment aperture to couple the front cover plate to the rear frame. The rear frame may further have an indicator light configured to indicate whether the rear frame is properly installed on the electrical device.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
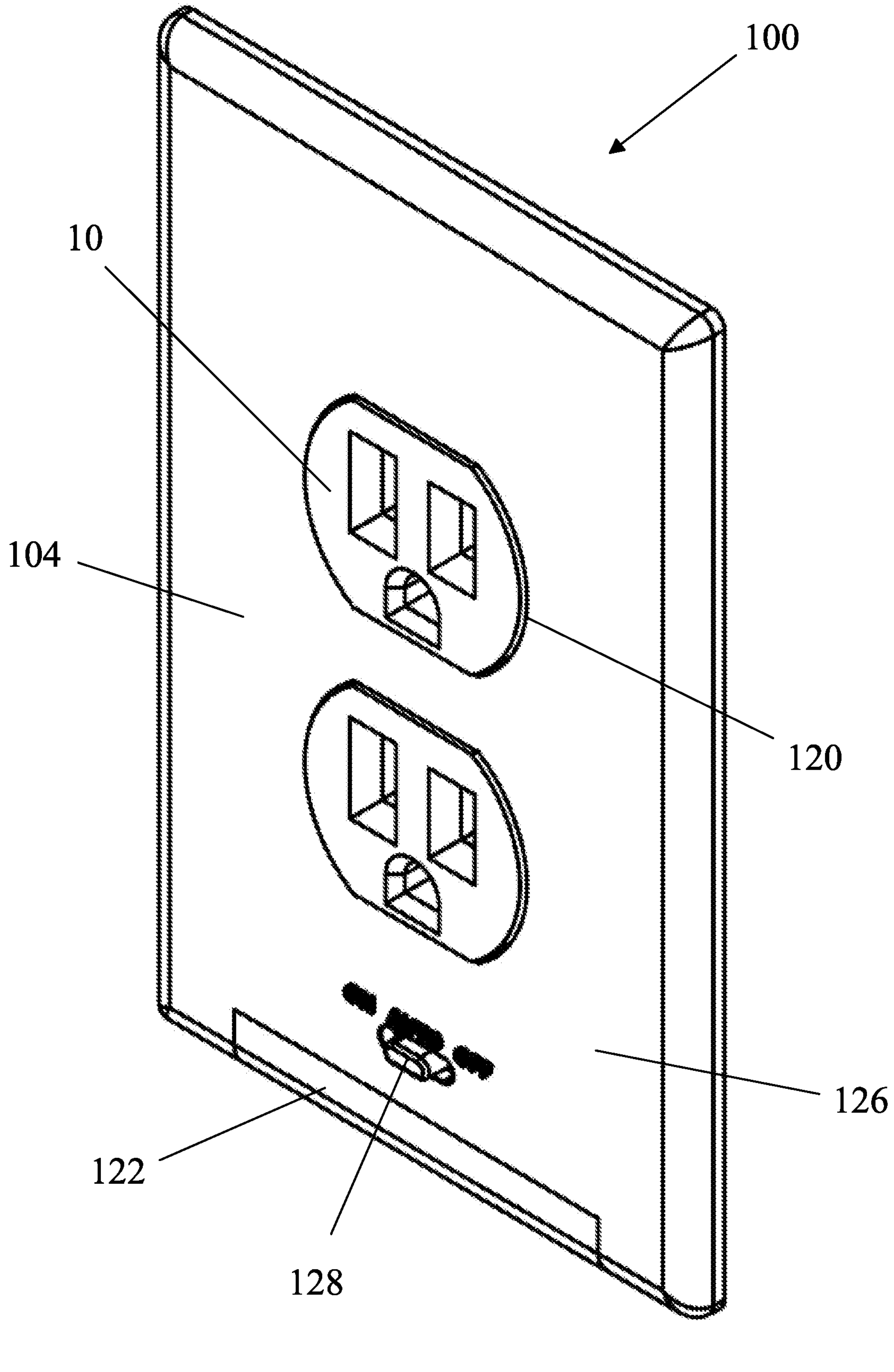
FIG. 1 is a perspective view of a two-part powered wall plate installed on an electrical device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a powered wall plate 100 that comprises a rear frame 102 and a front cover plate 104, as shown in FIGS. 1-6. The powered wall plate 100 maintains the protection that a conventional wall plate provides against electrical shock while also allowing the installer to visually see that electrical connections are correctly made behind the powered wall plate 100 by separating the installation of the rear frame 102 and the front cover plate 104. Thus, the rear frame 102 is configured to couple to an electrical device 10 independent of the front cover plate 104. In other words, when the powered wall plate 100 is installed on an electrical device 10, the rear frame 102 is installed first, without the front cover plate 104. The electrical device 10 may be an electrical outlet, as shown in FIGS. 1-6, or may be some other similar electrical device such as a light switch.

The rear frame 102 has a rear frame central aperture 106 that extends through the rear frame 102. The rear frame central aperture 106 is sized to expose the electrical device 10 through the rear frame central aperture 106. The rear frame 102 also has terminal connectors 108 extending away from the rear frame 102 adjacent to the rear frame central aperture 106. For example, a terminal connector 108 may be positioned on each side of the rear frame central aperture 106. In some embodiments, the rear frame 102 has at least two terminal connectors 108. The terminal connectors 108 are configured to electrically couple with electrical terminals 12 on the electrical device 10. The terminal connector 108 may be a spring arm that is biased toward a connected position. In such an embodiment, the terminal connector 108 is positioned such that, when the rear frame 102 is installed on the electrical device 10, the terminal connector 108 is moved away from the connected position by the electrical terminals 12. Because the terminal connector 108 is biased toward the connected position, the terminal connector 108 exerts a force toward the connected position, and thus maintains the electrical connection with the electrical terminal 12.

The rear frame 102 may also have an electrical circuit 110 that is electrically coupled to the terminal connectors 108, and thus is electrically powered by the electrical device 10 when the terminal connectors 108 are electrically coupled to the electrical terminals 12 on the electrical device 10. The electrical circuit 110 includes an electrical feature 112 that may be fixedly attached to the rear frame 102 and is powered by the electrical circuit 110. The electrical feature 112 may be any electrical component. For example, the electrical feature 112 may be a light such as an LED light, a charging port such as a USB charging port, a camera, a motion sensor, an infrared sensor, a carbon monoxide sensor, a smoke detector, or any other electrical component. In some embodiments, the electrical feature 112 is more than one electrical component. For example, the electrical feature 112 may be a light and an ambient light sensor, or a light and a USB charging port. The electrical circuit 110 may include any additional electrical components and/or circuitry that help to regulate power to the appropriate levels for the electrical feature 112.

The rear frame 102 may also have a screw aperture 114 extending through the rear frame 102. The screw aperture 114 is configured to receive a screw 116 and couple the rear frame 102 to the electrical device 10. In this way, the terminal connectors 108 can be coupled to the electrical terminals 12 of the electrical device 10, and then fixed in place with the screw 116 so that the electrical connection between the terminal connectors 108 and the electrical terminals 12 can be properly maintained. Other methods of attaching the rear frame 102 to the electrical device 10 may also be implemented, such as using a clip or other fastener.

The rear frame 102 may be shaped to allow a user to see the terminal connectors 108 in contact with the electrical terminals 12 of the electrical device 10 when the rear frame 102 is coupled to the electrical device 10. For example, the rear frame 102 may have a width that is small enough to see the terminal connectors 108 in contact with the electrical terminals 12. As another example, the rear frame 102 may have a through hole that allows the user to see the terminal connectors 108 in contact with the electrical terminals 12. Other configurations are also contemplated. The rear frame 102 may also have an indicator light 118 that is configured to indicate whether the rear frame 102 is properly installed on the electrical device 10. The indicator light 118 is electrically coupled to the electrical circuit 110 and may be configured to light up when a proper electrical connection exists between the terminal connectors 108 and the electrical terminals 12 of the electrical device 10. The indicator light 118 may also be configured to illuminate with a predetermined signal pattern to confirm proper installation. The indicator light 118 may be manually turned off prior to installing the front cover plate 104, or may be configured to automatically turn off, through a sensor or mechanical switch, when the front cover plate 104 is installed on the rear frame 102.

The front cover plate 104 is configured to attach to the rear frame 102 once the rear frame 102 has been coupled to the electrical device 10. In some embodiments, the front cover plate 104 is configured to snap onto the rear frame 102, as discussed in more detail below. The front cover plate 104 may have a front cover central aperture 120 that is similar to the rear frame central aperture 106. For example, the front cover central aperture 120 may be sized to expose the electrical device 10 through the front cover central aperture 120. The front cover central aperture 120 may also be configured to align with the rear frame central aperture 106 when the front cover plate is attached to the rear frame 102. This allows the electrical device 10 to be accessible to the user once the powered wall plate 100 has been installed on the electrical device 10. For example, the front cover central aperture 120 and the rear frame central aperture 106 together allow a user to plug an electrical plug into the electrical device 10 if the electrical device 10 is an electrical outlet. As another example, the front cover central aperture 120 and the rear frame central aperture 106 together allow the user to flip the switch on the electrical device 10 if the electrical device 10 is a light switch.

Figure 2:
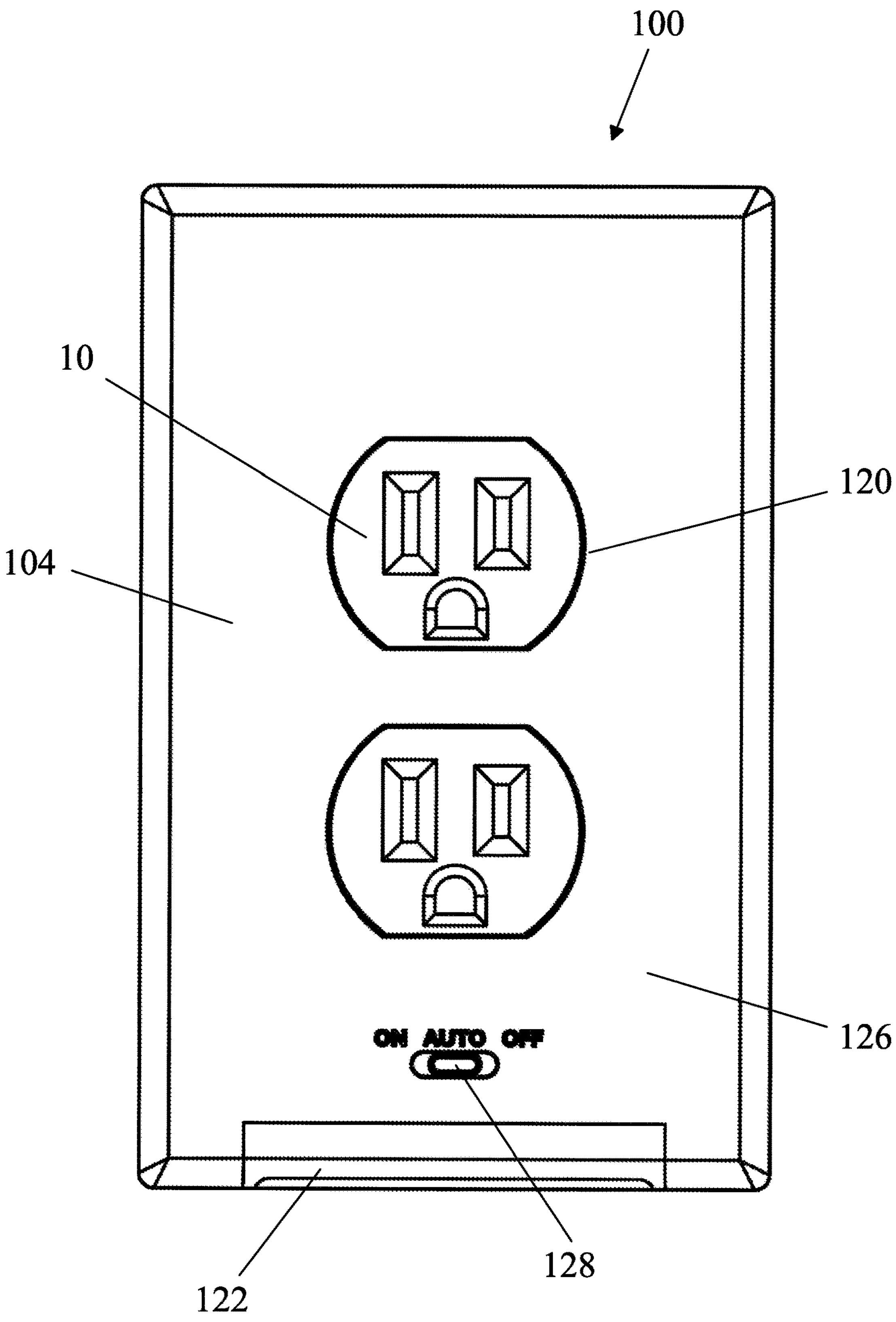
FIG. 2 is a front view of the two-part powered wall plate shown in FIG. 1.
Figure 3:
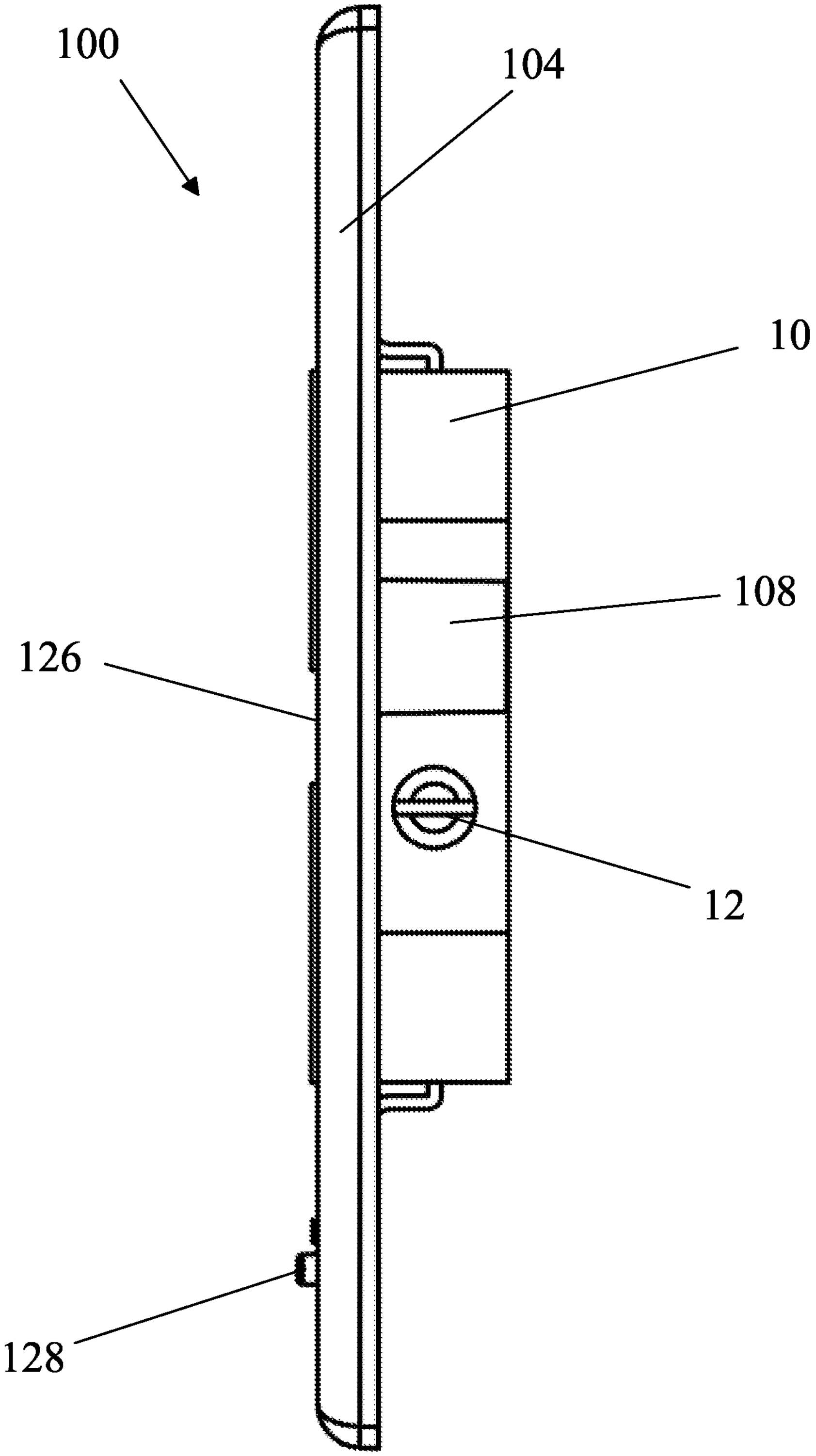
FIG. 3 is a side view of the two-part powered wall plate shown in FIG. 1.
Figure 4:
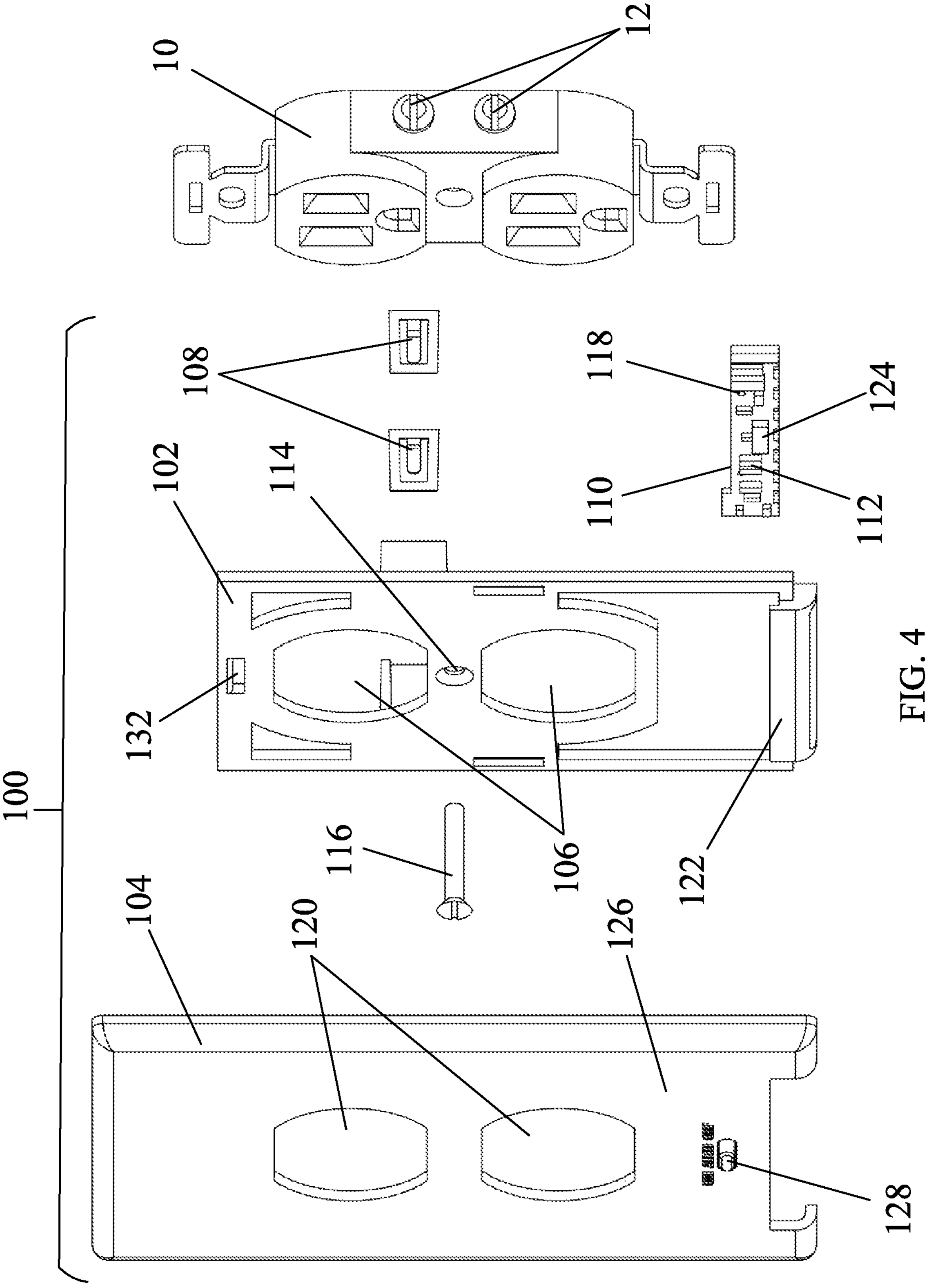
FIG. 4 is an exploded view of the two-part powered wall plate shown in FIG. 1.
Figure 5:
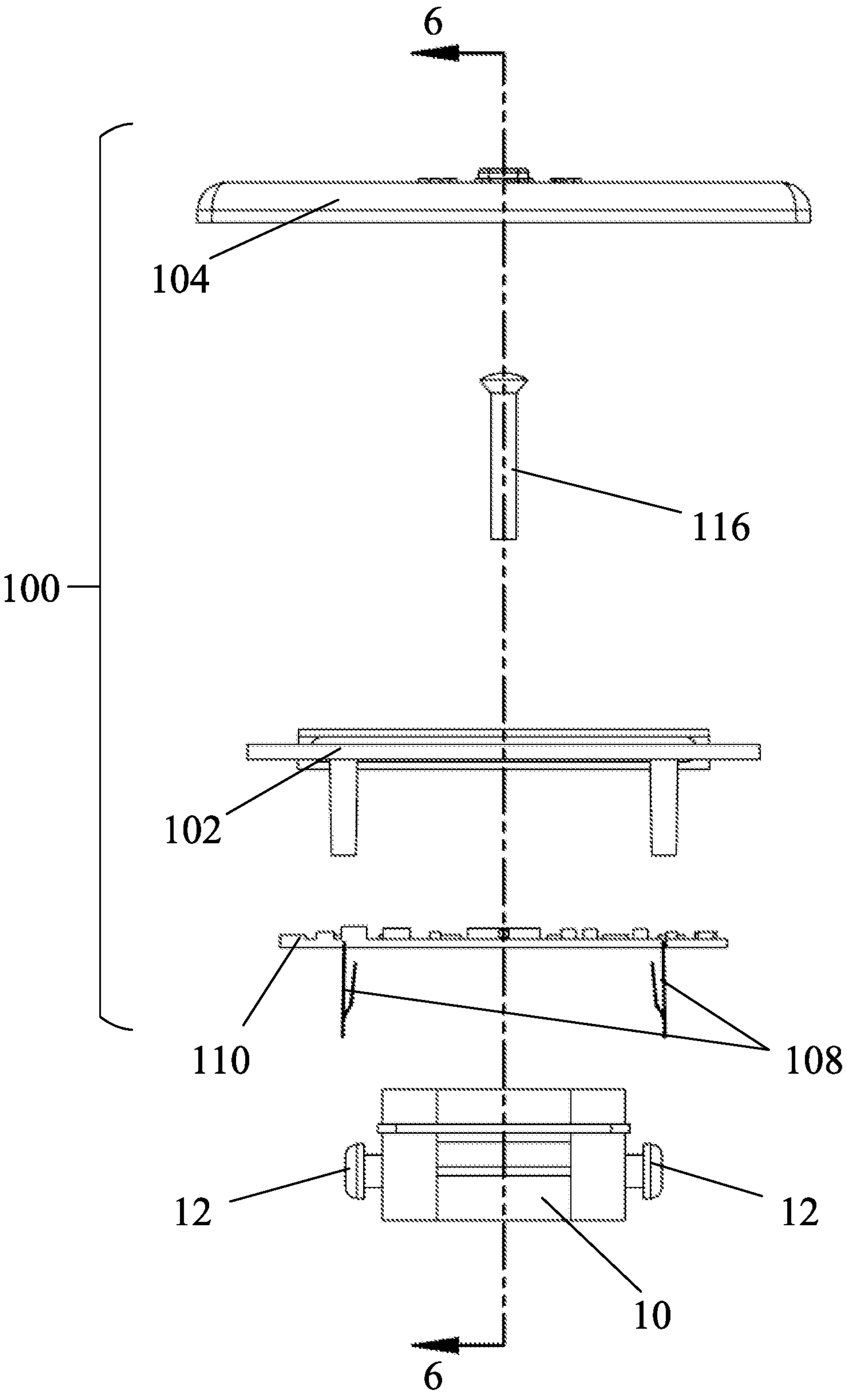
FIG. 5 is an exploded side view of the two-part powered wall plate shown in FIG. 1.
Figure 6:
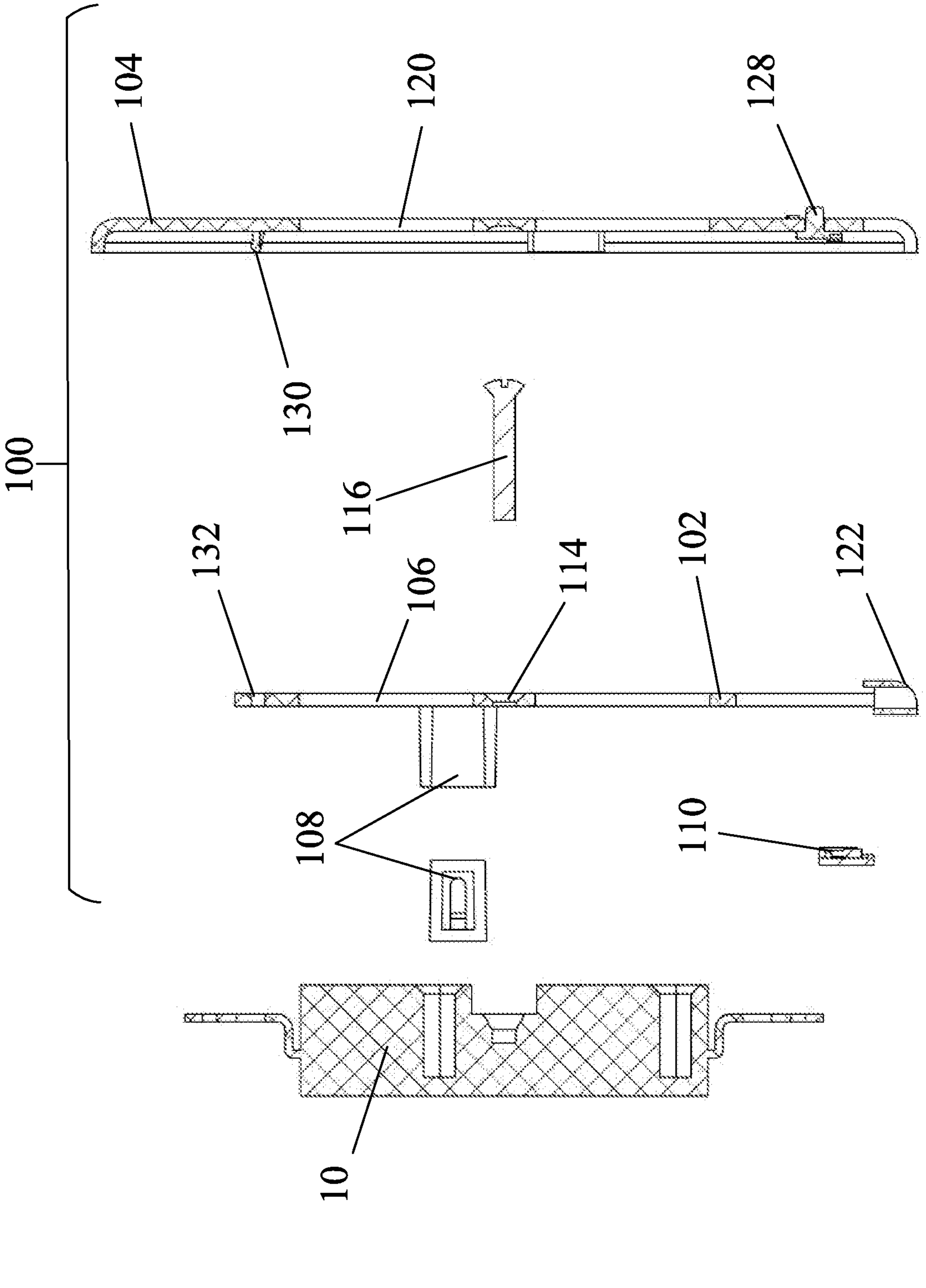
FIG. 6 is a cross section taken from FIG. 5 along line 6-6.

The front cover plate 104 may also be configured to cover the rear frame 102 and the screw aperture 114 when the front cover plate 104 is attached to the rear frame 102, as shown in FIGS. 1-3. This allows the front cover plate 104 to protect users from electrical shock in the same way that a conventional wall plate protects users. Additionally, because the screw aperture 114 is also concealed, the front cover plate 104 provides a more seamless or screwless look. The front cover plate 104 may be configured to expose the electrical feature 112 of the rear frame 102 through the front cover plate 104. The electrical feature 112 may be directly exposed and may be accessible through the front cover plate 104, such as in embodiments where the electrical feature 112 is a charging port. The electrical feature 112 may also be indirectly exposed, such as through a transparent or translucent portion of the front cover plate 104. This may be desirable if the electrical feature 112 is a light. In some embodiments, rather than having a transparent or translucent portion of the front cover plate 104, the electrical feature 112 may include a lens 122 or other component that is fixedly attached to the rear frame 102 as shown in FIG. 4 that extends through the front cover plate 104 with the same effect. In still other embodiments, the electrical feature 112 may be incorporated into the front cover 104 with an electrical circuit transferring electricity to the electrical feature 112.

The front cover plate 104 may have a circuit switch 124 on a front face 126 of the front cover plate 104. The circuit switch 124 is configured to couple with the electrical circuit 110 when the front cover plate 104 is attached to the rear frame 102 and is configured to control power to the electrical feature 112. For example, the circuit switch 124 may comprise a knob 128 that is moveable with respect to the front face 126 of the front cover plate 104. The knob 128 may couple with a component of the electrical circuit 110 when the front cover plate 104 is attached to the rear frame 102, such that a switch in the electrical circuit 110 can be controlled by the knob 128. Thus, when the powered wall plate is installed on an electrical device 10, the circuit switch 124 can be manipulated by the user to control the switch in the electrical circuit 110, and thus control power to the electrical feature 112. The circuit switch 124 may include an "on" position, an "off" position, and/or an "auto" position.

In some embodiments, the front cover plate 104 has a protrusion 130 configured to extend toward the rear frame 102, and the rear frame 102 has an attachment aperture 132 configured to receive the protrusion 130. In such embodiments, the protrusion 130 is configured to couple with or snap into the attachment aperture 132 to attach or couple the front cover plate 104 to the rear frame 102. This allows the front cover plate 104 to attach to the rear frame 102 without requiring additional fasteners or other components. However, in some embodiments, the front cover plate 104 attaches to the rear frame 102 through the use of additional fasteners.

As discussed above, a powered wall plate 100 with a rear frame 102 and a front cover plate 104 allows the user to install the rear frame 102 first and verify that the rear frame 102 has been installed correctly. This reduces the chances of improper installation, and thus increases safety and reduces the risk of sparks or arcing that could result in a fire. Then the front cover plate 104 can be installed over the rear frame 102, thus providing the protection that conventional wall plates provide against electrical shock. The principles taught herein are applicable to all powered wall plate implementations, and any existing powered wall plate configuration may be adapted to include an intermediate installation of a rear frame 102 that allows for viewing of the electrical connections with the electrical device 10 prior to installing a front cover plate 104 that covers up the opening and provides the final desired look for the wall plate 100.

As will be clear to one of ordinary skill in the art, components discussed above with respect to the rear frame 102 and/or to the front cover plate 104 may be incorporated into other components of the powered wall plate 100. For example, components of the rear frame 102 may be included on the front cover plate 104 and components of the front cover plate 104 may be included on the rear frame 102. As a particular example, while the disclosure above discusses the electrical circuit 110 as being part of the rear frame 102, a portion or all of the electrical circuit 110 could be moved to the front cover plate 104 instead. In such an embodiment, the front cover plate 104 may include a terminal bus configured to connect with a mating terminal bus on the rear frame 102 to provide power to the front cover plate 104.

Figure 7:
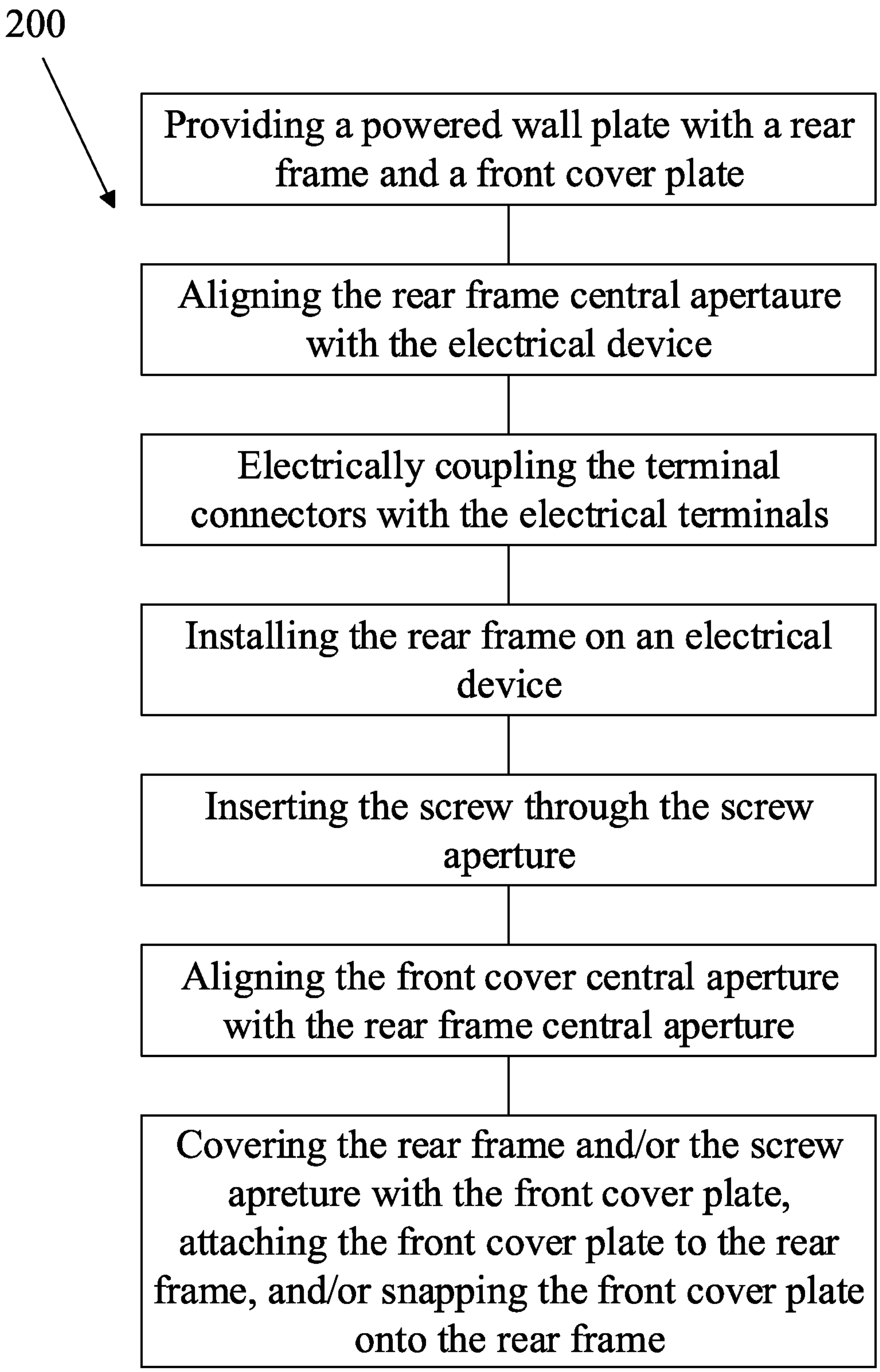
FIG. 7 is a process diagram illustrating a method of installing the two-part powered wall plate shown in FIG. 1 on an electrical device.

The powered wall plate 100 may be installed on an electrical device 10 using method 200 illustrated in FIG. 7. Method 200 comprises providing a powered wall plate 100 with a rear frame 102 and a front cover plate 104, wherein the rear frame 102 and the front cover plate 104 are separate components, installing the rear frame 102 on an electrical device, and attaching the front cover plate 104 to the rear frame 102. Additional steps of method 200 will be apparent to one of ordinary skill in the art from the disclosure of the powered wall plate 100 discussed above. For example, method 200 may also comprise aligning the rear frame central aperture 106 with the electrical device 10, electrically coupling the terminal connectors 108 with the electrical terminals 12, and/or inserting the screw 116 through the screw aperture 114 to couple the rear frame 102 to the electrical device 10. As another example, method 200 may also comprise aligning the front cover central aperture 120 with the rear frame central aperture 106, covering the rear frame 102 with the front cover plate 104, covering the screw aperture 114 with the front cover plate 104, and/or snapping the front cover plate 104 onto the rear frame 102. Other steps will be apparent to one of ordinary skill in the art.

It will be understood that implementations of a two-part powered wall plate are not limited to the specific assemblies, devices and components disclosed in this document, as virtually any assemblies, devices and components consistent with the intended operation of a two-part powered wall plate may be used. Accordingly, for example, although particular two-part powered wall plates, and other assemblies, devices and components are disclosed, such may include any shape, size, style, type, model, version, class, measurement, concentration, material, weight, quantity, and/or the like consistent with the intended operation of two-part powered wall plates. Implementations are not limited to uses of any specific assemblies, devices and components; provided that the assemblies, devices and components selected are consistent with the intended operation of a two-part powered wall plate.

Accordingly, the components defining any two-part powered wall plate may be formed of any of many different types of materials or combinations thereof that can readily be formed into shaped objects provided that the materials selected are consistent with the intended operation of a two-part powered wall plate. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various two-part powered wall plates may be manufactured using conventional procedures as added to and improved upon through the procedures described here. Some components defining a two-part powered wall plate may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling two-part powered wall plates are not limited to the specific order of steps as disclosed in this document. Any steps or sequence of steps of the assembly of a two-part powered wall plate indicated herein are given as examples of possible steps or sequence of steps and not as limitations, since various assembly processes and sequences of steps may be used to assemble two-part powered wall plates.

The implementations of a two-part powered wall plate described are by way of example or explanation and not by way of limitation. Rather, any description relating to the foregoing is for the exemplary purposes of this disclosure, and implementations may also be used with similar results for a variety of other applications employing a two-part powered wall plate.

What is claimed is:

1. A powered wall plate comprising:

a rear frame configured to couple with an electrical device, the rear frame having:

a rear frame central aperture sized to expose the electrical device through the rear frame central aperture;

at least two terminal connectors extending away from the rear frame adjacent the rear frame central aperture, the terminal connectors configured to electrically couple with electrical terminals on the electrical device;

an electrical circuit electrically coupled to the at least two terminal connectors and including an electrical feature fixedly attached to the rear frame and powered by the electrical circuit; and a screw aperture extending through the rear frame, the screw aperture configured to receive a screw and couple the rear frame to the electrical device; and a front cover plate configured to snap onto the rear frame and cover the rear frame and the screw aperture, the front cover plate having:

a front cover central aperture sized to expose the electrical device through the front cover central aperture and configured to align with the rear frame central aperture when the front cover plate is snapped onto the rear frame; and a circuit switch on a front face of the front cover plate configured to couple with the electrical circuit when the front cover plate is snapped onto the rear frame and control power to the electrical feature;

wherein the front cover plate is configured to expose the electrical feature of the rear frame through the front cover plate.

2. The powered wall plate of claim 1, wherein the rear frame is configured to couple to the electrical device independent of the front cover plate.

3. The powered wall plate of claim 1, wherein the rear frame is shaped to allow a user to see the terminal connectors in contact with the electrical terminals of the electrical device when the rear frame is coupled to the electrical device.

4. The powered wall plate of claim 1, the rear frame further having an indicator light configured to indicate whether the rear frame is properly installed on the electrical device.

5. The powered wall plate of claim 1, the front cover plate further having a protrusion extending toward the rear frame and the rear frame further having an attachment aperture configured to receive the protrusion of the front cover plate, wherein the protrusion is configured to snap into the attachment aperture to couple the front cover plate to the rear frame.

6. A powered wall plate comprising:

a rear frame configured to couple with an electrical device, the rear frame having:

a rear frame central aperture sized to expose the electrical device through the rear frame central aperture;

at least two terminal connectors extending away from the rear frame adjacent the rear frame central aperture, the terminal connectors configured to electrically couple with electrical terminals on the electrical device; and an electrical circuit electrically coupled to the at least two terminal connectors and including an electrical feature powered by the electrical circuit; and a front cover plate configured to attach to the rear frame and cover the rear frame, the front cover plate having a front cover central aperture sized to expose the electrical device through the front cover central aperture and configured to align with the rear frame central aperture when the front cover plate is attached to the rear frame, wherein the front cover plate is configured to expose the electrical feature of the rear frame;

wherein the rear frame is configured to couple to the electrical device independent of the front cover plate.

7. The powered wall plate of claim 6, wherein the rear frame is shaped to allow a user to see the terminal connectors in contact with the electrical terminals of the electrical device when the rear frame is coupled to the electrical device.

8. The powered wall plate of claim 6, the rear frame further having a screw aperture extending through the rear frame, the screw aperture configured to receive a screw and couple the rear frame to the electrical device.

9. The powered wall plate of claim 8, wherein the front cover plate is configured to cover the screw aperture.

10. The powered wall plate of claim 6, wherein the front cover plate is configured to snap onto the rear frame.

11. The powered wall plate of claim 10, the front cover plate further having a protrusion extending toward the rear frame and the rear frame further having an attachment aperture configured to receive the protrusion of the front cover plate, wherein the protrusion is configured to snap into the attachment aperture to couple the front cover plate to the rear frame.

12. The powered wall plate of claim 6, the rear frame further having an indicator light configured to indicate whether the rear frame is properly installed on the electrical device.

13. A powered wall plate comprising:

a rear frame configured to couple with an electrical device, the rear frame having a rear frame central aperture extending through the rear frame sized to expose the electrical device through the rear frame central aperture and a screw aperture extending through the rear frame, the screw aperture configured to receive a screw and couple the rear frame to the electrical device;

an electrical circuit configured to electrically couple to the electrical device;

an electrical feature coupled to the cover plate and powered by the electrical circuit; and a front cover plate configured to attach to the rear frame and cover the rear frame and the screw aperture, the front cover plate having a front cover central aperture sized to expose the electrical device through the front cover central aperture and configured to align with the rear frame central aperture when the front cover plate is attached to the rear frame, wherein the front cover plate is configured to expose the electrical feature.

14. The powered wall plate of claim 13, the rear frame further having at least two terminal connectors extending away from the rear frame adjacent the rear frame central aperture, the terminal connectors configured to electrically couple with electrical terminals on the electrical device.

15. The powered wall plate of claim 14, wherein the rear frame is shaped to allow a user to see the terminal connectors in contact with the electrical terminals of the electrical device when the rear frame is coupled to the electrical device.

16. The powered wall plate of claim 13, wherein the rear frame is configured to couple to the electrical device independent of the front cover plate.

17. The powered wall plate of claim 13, the front cover plate further having a circuit switch on a front face of the front cover plate configured to couple with the electrical circuit when the front cover plate is attached to the rear frame and control power to the electrical feature.

18. The powered wall plate of claim 13, wherein the front cover plate is configured to snap onto the rear frame.

19. The powered wall plate of claim 18, the front cover plate further having a protrusion extending toward the rear frame and the rear frame further having an attachment aperture configured to receive the protrusion of the front cover plate, wherein the protrusion is configured to snap into the attachment aperture to couple the front cover plate to the rear frame.

20. The powered wall plate of claim 13, the rear frame further having an indicator light configured to indicate whether the rear frame is properly installed on the electrical device.

* * * * *